United States Patent [19]

Molina

[11] Patent Number: 4,768,607

[45] Date of Patent: Sep. 6, 1988

[54] FREEWHEEL FLYWHEEL TRANSMISSION SYSTEM

[76] Inventor: Antonio F. Molina, 3674 SW. 25th St., Miami, Fla. 33133

[21] Appl. No.: 844,485

[22] Filed: Mar. 26, 1986

Related U.S. Application Data

[63] Continuation of Ser. No. 502,564, Jun. 9, 1983, abandoned.

[51] Int. Cl.$^4$ ............................................. B62M 1/10
[52] U.S. Cl. ..................................... 180/165; 60/698; 180/65.2; 280/217
[58] Field of Search ..................... 180/165, 65.2, 65.3, 180/65.4; 280/217; 474/73; 60/698

[56] References Cited

U.S. PATENT DOCUMENTS

| | | | |
|---|---|---|---|
| 841,239 | 1/1907 | Fouts | 280/217 |
| 1,612,739 | 12/1926 | Matsumoto | 280/217 |
| 2,401,317 | 6/1946 | Richards | 474/73 |
| 2,607,613 | 8/1952 | Lesaunier | 280/217 |
| 3,367,438 | 2/1968 | Moore | 180/65.2 |
| 3,870,116 | 3/1975 | Seliber | 180/165 |
| 4,183,418 | 1/1980 | Dudas | 180/65.2 |
| 4,353,569 | 10/1982 | Molina | 280/217 |
| 4,606,193 | 8/1986 | Molina | 74/572 X |

Primary Examiner—John J. Love
Assistant Examiner—Michael Mar
Attorney, Agent, or Firm—John P. White; John J. Santalone

[57] ABSTRACT

A freewheel flywheel transmission system capable of storing and releasing kinetic rotational energy, which includes a shaft rotatively supported by a frame and a plurality of flywheels rigidly mounted on the shaft. The transmission system is provided with an input sprocket for rotating the shaft in response to power transmitted from a power source. A sprocket assembly is mounted on the shaft for transmitting the rotational movement from the flywheels to a drive-wheel sprocket. In one embodiment, power is provided to a freewheel sprocket which rotates the shaft, and thereby the plurality of flywheels. The sprocket assembly includes a first and a second sprocket of different diameters each rotatively supported on bearings on the shaft. First and second clutches are used for engaging, respectively, the first sprocket and a first flywheel of said plurality of flywheels, and the second sprocket and a second flywheel, enabling the user to transfer the energy to the drive-wheel sprocket so as to operate a vehicle in a plurality of modes as the power needs vary.

1 Claim, 3 Drawing Sheets

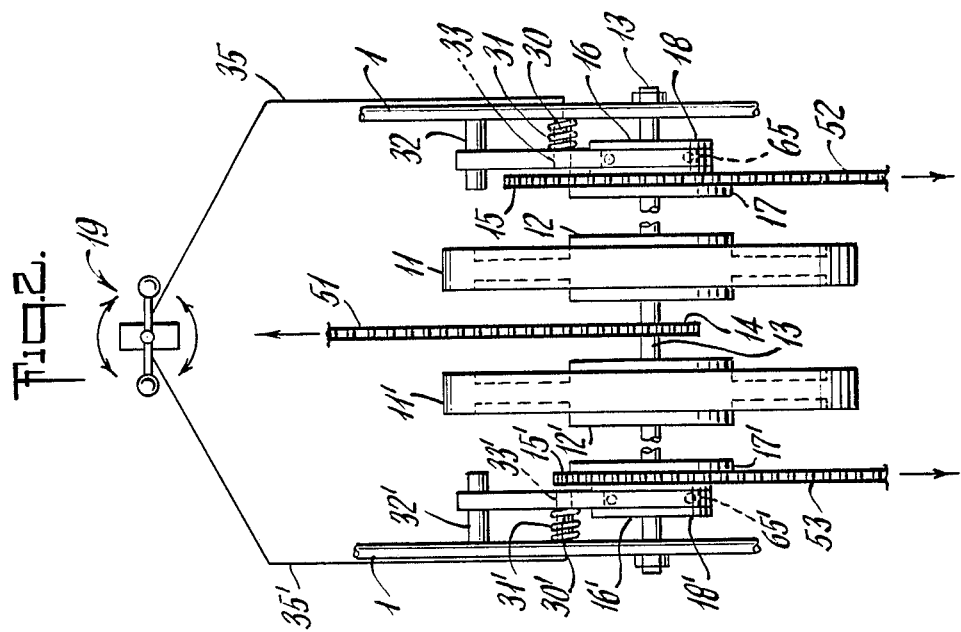
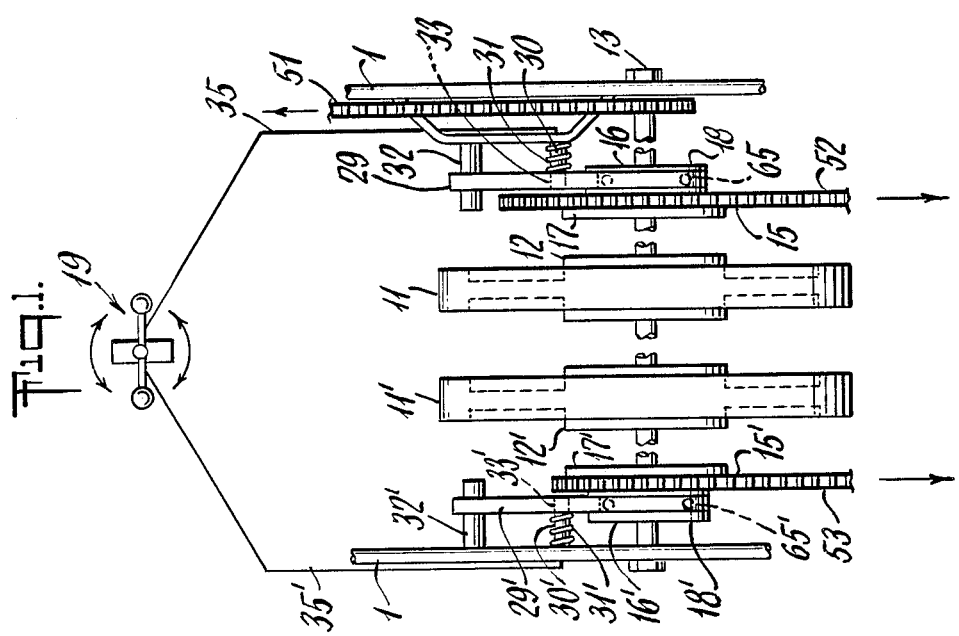

FREEWHEEL FLYWHEEL TRANSMISSION SYSTEM

This application is a continuation of U.S. Ser. No. 502,564 filed June 9, 1983, now abandoned.

BACKGROUND OF THE INVENTION

This invention relates to transmission systems for vehicles. More particularly, this invention relates to a freewheel flywheel transmission system which includes a plurality of freewheeling flywheels and sprocket wheels or gears or both, for increasing power and performance while conserving energy.

The use of a freewheel flywheel in a transmission system to store and later release kinetic rotational energy to a wheel of a vehicle is known in the art; see, for example, my earlier patent, U.S. Pat. No. 4,353,569, issued Oct. 12, 1982. However, heavy vehicles and equipment require more kinetic rotational energy from the freewheel flywheel transmission than lighter vehicles such as bicycles. Such earlier systems are thus impractical for heavy vehicles and equipment since the flywheel would necessarily be of unacceptably great dimensions and size.

SUMMARY OF THE INVENTION

A freewheel flywheel transmission system, which includes a frame, a shaft rotatively supported by said frame, a plurality of flywheels rigidly mounted on the shaft, a means for rotating the shaft in response to power transmitted from a power source, and a first sprocket means mounted on the shaft for transmitting the rotational movement or power from the plurality of flywheels to a second sprocket means.

The first sprocket means may be rigidly mounted on said shaft. Desirably, the first sprocket means comprises a first sprocket rotatively supported on bearings by the shaft, and a second sprocket, having a diameter greater than the diameter of the first sprocket, also rotatively supported on bearings by the shaft; the transmission system further includes a first clutch means for engaging and disengaging the first sprocket and a first flywheel of said plurality of flywheels, and a second clutch means for engaging and disengaging the second sprocket and a second flywheel of said plurality of flywheels.

Desirably, the means for rotating the shaft comprises a freewheel sprocket mounted on the shaft. The means for rotating the shaft may include a plurality of freewheel sprockets mounted on the shaft.

A power train trailer for a wheeled vehicle which contains the freewheel flywheel transmission system and includes an axle rotatively supported by the frame, a third sprocket means mounted on the axle, a tractive wheel mounted on the axle for rotating the axle and the third sprocket means when the vehicle is in motion, and a means for transmitting the rotational movement or power from the third sprocket means to the means for rotating the shaft.

Desirably, the power train trailer includes an alternator, the second sprocket means being rotatively moved on said alternator.

A power train for a wheeled vehicle which contains the freewheel flywheel transmission system and includes an axle rotatively supported by the frame, the second sprocket means being mounted on the axle, transmission means coupling the first and second sprocket means, a driven wheel mounted on the axle, and a clutch means for engaging and disengaging the first sprocket means and a first flywheel of the plurality of flywheels, whereby the rotational movement or power of the flywheels is transmitted to the second sprocket means and thereby to the axle and driven wheel when the clutch means is engaged.

Desirably, the power train further includes a power means and a second transmission means coupling the power means and the means for rotating the shaft. Desirably, the power means includes an electric motor, or an internal combustion engine, or both.

A power train for a wheeled vehicle which contains the freewheel flywheel transmission system and includes an axle rotatively supported by the frame, a third sprocket means mounted on the axle, a tractive wheel mounted on the axle for rotating the axle and the third sprocket means when the vehicle is in motion, and a transmission means coupling the third sprocket means and the means for rotating the shaft so that the rotation of the third sprocket means effects a simultaneous and corresponding rotation of the means for rotating the shaft.

It is an object of this invention to achieve a freewheel flywheel transmission system capable of storing and releasing kinetic rotational energy in a very simple manner.

Another important object is to provide a freewheel flywheel transmission system including a plurality of flywheels which is suitable and advantageous for use in heavy vehicles or equipment.

Another important object is to provide a power train trailer for wheeled vehicles which includes a freewheel flywheel transmission system and which may be attached to any bicycle, tricycle or multi-wheeled vehicle.

Another important object is to provide a power train including a freewheel flywheel transmission system suitable for positioning under the rear-end section of a wheeled vehicle chassis.

BRIEF DESCRIPTION OF THE DRAWINGS

FIG. 1 is a front view of one embodiment of a freewheel flywheel transmission system showing two flywheels rigidly mounted to a freewheeling shaft having affixed to one end a sprocket wheel for rotating the shaft in response to power transmitted from a power source. On the right side of the right flywheel, a ball bearing mounted first sprocket wheel is engaged and disengaged with the right flywheel by a first clutch assembly. On the left side of the left flywheel, a relatively larger ball bearing mounted second sprocket wheel is engaged and disengaged with the left flywheel by a second clutch assembly.

FIG. 2 is a front view of another embodiment of a freewheel flywheel transmission system according to this invention, wherein the sprocket wheel actioning the shaft is mounted approximately at the middle of said shaft.

DETAILED DESCRIPTION OF THE INVENTION

Figure 3:
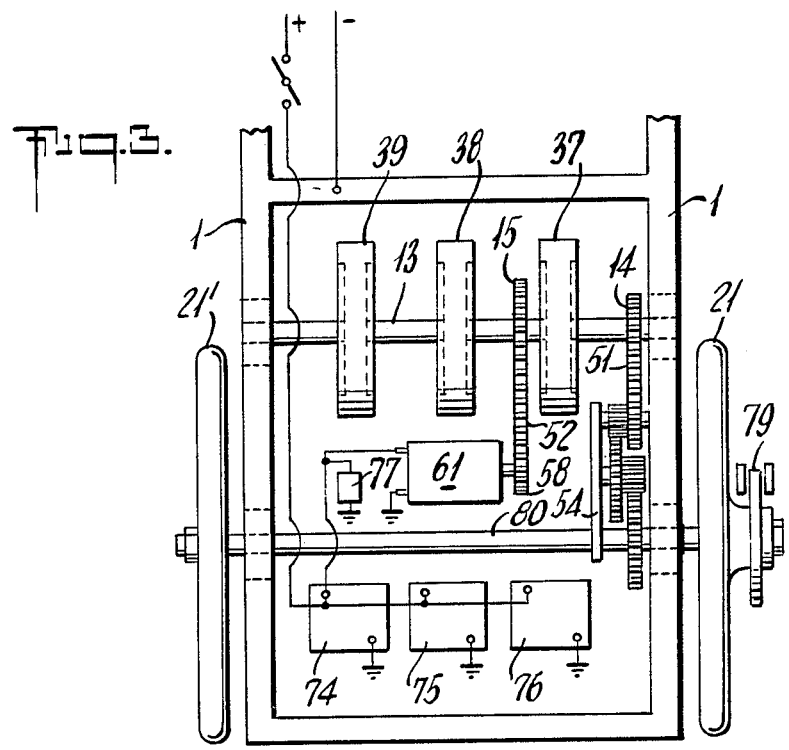
FIG. 3 is a top, fragmentary view of a power train trailer for a wheeled vehicle incorporating a freewheel flywheel transmission system according to this invention.

A freewheel flywheel transmission system, which includes a frame, a shaft rotatively supported by said frame, a plurality of flywheels rigidly mounted on the shaft, a means for rotating the shaft in response to power transmitted from a power source, and a first sprocket means mounted on the shaft for transmitting the rotational movement or power from the plurality of flywheels to a second sprocket means. The frame desirably may be a portion of a vehicle frame, as for example, a bicycle frame. The plurality of flywheels affixed to the shaft rotate simultaneously and in correspondence with the shaft when power from a power source is transmitted to the means for rotating the shaft.

In one embodiment, the first sprocket means is rigidly mounted on said shaft, and thus rotates simultaneously and in correspondence with the flywheels. The sprocket means may be gear-linked to a second sprocket means, or, more desirably, linked by transmission means such as a chain, or belt or the like, to the second sprocket means. Desirably, the first sprocket means comprises a first sprocket rotatively supported on bearings by the shaft, and a second sprocket, having a diameter greater than the diameter of the first sprocket, also rotatively supported on bearings by the shaft; the transmission system further includes a first clutch means for engaging and disengaging the first sprocket and a first flywheel of said plurality of flywheels, and a second clutch means for engaging and disengaging the second sprocket and a second flywheel of said plurality of flywheels. When either the first or second clutch means is engaged, the rotational movement of the flywheels is transmitted to the second sprocket means.

Desirably, the means for rotating the shaft comprises a freewheel sprocket mounted on the shaft. The means for rotating the shaft may include a plurality of freewheel sprockets mounted on the shaft.

A power train trailer for a wheeled vehicle which contains the freewheel flywheel transmission system and includes an axle rotatively supporting the frame, a third sprocket means mounted on the axle, a tractive wheel mounted on the axle for rotating the axle and the third sprocket means when the vehicle is in motion, and a means for transmitting the rotational movement or power from the third sprocket means to the means for rotating the shaft.

Desirably, the power train trailer includes an alternator, the second sprocket means being rotatively mounted on said alternator for operation of said alternator in response to the transmission of the rotational movement of the flywheels by the first sprocket means.

A power train for a wheeled vehicle which contains the freewheel flywheel transmission system and includes an axle rotatively supported by the frame, the second sprocket means being mounted on the axle, transmission means coupling the first and second sprocket means, a driven wheel mounted on the axle, and a clutch means for engaging and disengaging the first sprocket means and a first flywheel of the plurality of flywheels, whereby the rotational movement or power of the flywheels is transmitted to the second sprocket means and thereby to the axle and driven wheel when the clutch means is engaged.

Desirably, the power train further includes a power means and a second transmission means coupling the power means and the means for rotating the shaft. Desirably, the power means includes an electric motor, or an internal combustion engine, or both.

In another embodiment, the power train for a wheeled vehicle contains the freewheel flywheel transmission system and includes an axle rotatively supported by the frame, a third sprocket means mounted on the axle, a tractive wheel mounted on the axle for rotating the axle and the third sprocket means when the vehicle is in motion, and a transmission means coupling the third sprocket means and the means for rotating the shaft so that the rotation of the third sprocket means effects a simultaneous and corresponding rotation of the means for rotating the shaft.

FIG. 1 illustrates one embodiment of a freewheel flywheel transmission system according to this invention, comprised of a first flywheel 11 and a second flywheel 11', with clutch plates or assembly 12 mounted on the right side of said flywheel 11 and clutch plate or assembly 12' mounted on the left side of flywheel 11', said first and second flywheels being mounted on and attached to a freewheeling shaft 13. Freewheeling shaft 13 is rotatively supported by a frame, shown in partial view as 1, said frame desirably being a portion of a vehicle frame, as, for example, a bicycle frame. It is the function of clutch assembly 12 to engage and disengage flywheel 11 and a first sprocket 15 when needed. It is the function of clutch assembly 12' to engage and disengage flywheel 11' and a second sprocket 15' when needed. It will be appreciated that additional flywheels, clutch assemblies and sprockets may be provided to this system.

Sprockets 15 and 15' are each independently mounted on separate shaft sleeves 16 and 16', respectively, said shaft sleeves being rotatively supported by said shaft.

Flywheels 11 and 11', mounted on freewheeling shaft 13, thus function as freewheel flywheels to which all power from a power source is transmitted through the responsive rotation of freewheeling sprocket wheel 14 affixed to shaft 13 and linked by transmission means to the power source; freewheeling sprocket wheel 14 in turn rotates shaft 13. It will be appreciated that the power source may conveniently comprise a pedal assembly operated by a human user, an electric motor, an internal combustion engine, or the like.

All of the power applied to freewheel flywheels 11 and 11' plus the large rotational inertia and the speed stabilization effects are transmitted, upon engaging either sprocket 15 or sprocket 15', via transmission means 52 or 53, respectively, to a second sprocket means which may conveniently be gear- or chain-linked to a vehicle driven wheel.

Sprocket 15 has clutch assemblies 17 and 18 mounted on its left and right sides for engaging and disengaging with freewheel flywheel 11. Similarly, sprocket 15' has clutch assemblies 17' and 18' mounted on its right and left sides for engaging and disengaging with freewheel flywheel 11'. Sprocket 15 and flywheel 11, or sprocket 15' and flywheel 11', may be engaged by the slight side-way movement of the respective sprocket 15 or 15'. In the embodiment as shown in FIG. 1, clutch lever 19 moving from neutral to the right or left side alternately engages and disengages sprocket 15 and 15' to or away from their respective flywheel clutch faces 12 or 12' by the push-pull action on the cables 35 and 35' connected to journaled hooks 29 and 29'. Each one of these hooks slides, longitudinally, on shaft sleeves 16 and 16', and on guiding posts 32 and 32'. Guiding posts 30 and 30' are rigidly mounted at one end to hooks 29 and 29', respectively, while the other end of said guiding posts are guided by holes 33 and 33' in frame 1. On guiding posts 30 and 30' are coil springs 31 and 31', respectively, each of which normally projects its respective associated hook in the direction of flywheels 11 and 11', respectively. Guiding posts 32 and 32' maintain the hook alignment during the hook operations.

Therefore, in a vehicle or the like equipped with a freewheel flywheel transmission system according to this invention, when power is transmitted to sprocket 14, said sprocket will rotate freewheeling shaft 13 and freewheeling flywheels 11 and 11'. If sprocket 15 is engaged to the in-motion flywheel 11, the rotational movement from the flywheels will be transmitted via transmission means 52 to a second sprocket means, which if said second sprocket is linked to a vehicle driven wheel, will move the vehicle. Similarly, if sprocket 15' is engaged to flywheel 11', the rotational movement from the flywheels will be transmitted via transmission means 53 to the second sprocket means. But once sprockets 15 and 15' are disengaged, only the freewheel flywheeling 11 and 11' will be actioned by the applied power. At this time, and this is an important feature, more power, with very little effort or energy consumption, can be added to the spinning freewheeling flywheels; said added power can be considered as stored energy within the freewheeling flywheel rotational inertia. In a vehicle, while the vehicle is standing, some power can be easily applied to the freewheeling flywheels while sprockets 15 and 15' are disengaged, to be used when so desired by simply engaging either spinning flywheel 11 or 11'.

Another important feature of this freewheel flywheel transmission system as shown in FIG. 1, especially in the case of a vehicle such as a bicycle, is the introduction of the different size sprockets 15, 15' and 14, which provide a greater pace rate with less effort or energy consumption; moreover, the different diameters of sprockets 15 and 15' allow for different gear ratios.

Rotational energy produced by a power source, such as a bicycle pedal assembly, is transmitted via chain 51 to freewheel sprocket 14 which is mounted on shaft 13. As the rotational speed increases, the rotational energy stored in flywheels 11 and 11' also increases. Flywheel 11 may be engaged by sprocket 15 through clutch assemblies 17-18 and clutch plate 12. Flywheel 11' may be engaged by sprocket 15' through clutch assembly 17'-18' and clutch plate 12'. These clutch assemblies and plates are provided with conventional high friction areas that are brought into contact through the lateral movement of hook 29, or 29', depending on which direction lever 19 is activated. Either hook, 29 or 29', will experience a slight synchronized, and in the opposite direction, lateral displacement caused by lever 19 operation. Clutch assemblies 18 and 18' are journalled in hooks 29 and 29', respectively. Hooks 29 and 29' are provided with ball bearings 65 (in phantom). Sprocket wheels 15 and 15', mounted on bearings (not shown in drawing), are rigidly fastened to assemblies 17-18 and 17'-18', respectively, which in turn are mounted on shaft 13; thus sprockets 15 and 15' freewheel with respect to shaft 13.

When clutch assembly 17-18 is engaged to clutch plate 12, power is being transmitted to a second sprocket means by sprocket 15 fastened to clutch assembly 17-18. When sprocket 15 and flywheel 11 are so engaged, sprocket 15' and flywheel 11' are disengaged. Similarly, when clutch assembly 17'-18' is engaged to clutch plate 12', power is being transmitted to a second sprocket means by sprocket 15' fastened to clutch assembly 17'-18', and sprocket 15 and flywheel 11 are disengaged.

FIG. 2 shows another embodiment of a freewheel flywheel transmission system, in which sprocket 14 is mounted on shaft 13 between flywheels 11 and 11'.

FIG. 3 illustrates one embodiment of a power train in the nature of a trailer for a wheeled vehicle and including the freewheel flywheel transmission system according to this invention. Freewheeling shaft 13 is rotatively supported by a frame 1. Flywheels 37, 38 and 39 are rigidly affixed to shaft 13, and thus function as freewheel flywheels. Axle 80 rotatively supported on bearings (shown in phantom) by frame 1, has affixed at either end tractive wheels 21 and 21', respectively. When a wheeled vehicle (not shown) to which the power train trailer is attached is placed in motion, tractive wheel 21 rotates, thereby rotating axle 80 and sprocket assembly 54, also mounted on said axle 80. Sprocket 54 through transmission means 51 rotates freewheel sprocket 14 affixed to freewheeling shaft 13, thereby rotating shaft 13. Said shaft 13, mounted on bearings on frame 1, rotates affixed flywheels 37, 38 and 39, and also affixed sprocket 15. Sprocket 15 through transmission means 52 rotates sprocket 58 affixed to alternator 61, consequently charging batteries 74, 75 and 76 during the time the power train is in motion or the flywheels are spinning because of their freewheeling action. The spinning flywheels exert power only on sprocket 58 affixed to alternator 61, and not on sprocket 54, since sprocket 14 is a freewheel. In an electrically operated vehicle, batteries 74, 75 and 76 may be attached to the vehicle motor or engine for providing electrical power thereto, with voltage regulator 77 completing the electrical circuit. In the embodiment of FIG. 3, the trailer is suitably provided with disc brake 79 on tractive wheel 21 for additional braking where the vehicle to which the trailer is attached is operating at high speeds. Any bicycle, tricycle of four wheel vehicle can be used with or without the power train trailer.

Figure 4:
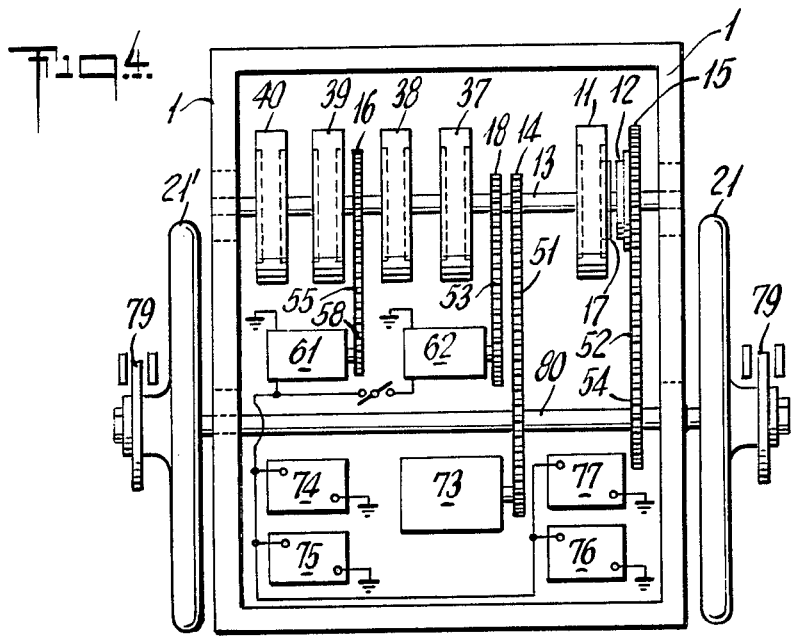
FIG. 4 is a top view of a power train for a wheeled vehicle incorporating another embodiment of a freewheel flywheel transmission system according to this invention.

FIG. 4 illustrates one embodiment of a power train for a wheeled vehicle including the freewheel flywheel transmission system according to this invention. The power train may conveniently be positioned under the vehicle chassis rear-end section. Freewheeling shaft 13 is rotatively supported on bearings (shown in phantom) by frame 1. Flywheels 37, 38, 39, 40 and 11 are rigidly affixed to shaft 13, and thus function as freewheel flywheels. Axle 80, rotatively supported by frame 1, has affixed at either end tractive wheels 21 and 21', respectively. Internal combustion engine 73 provides power to rotate freewheel sprocket 14, mounted on shaft 13, via transmission means 51. Electric motor 62 provides power to rotate freewheel sprocket 18, mounted on shaft 13, via transmission means 53. Both power sources, internal combustion engine 73 and electric motor 62, independently rotate freewheeling shaft 13, and consequently rotate freewheeling flywheels 11, 37, 38, 39, 40 and sprocket 16, affixed to shaft 13. Sprocket 16 in turn rotates sprocket means 58, affixed to alternator 61, via transmission means 55 to recharge batteries 74, 75, and 76. Voltage regulator 77 completes the electrical circuit.

Flywheel 11 has affixed, on the right side, clutch plate 17, with the cooperating clutch plate 12 being affixed to sprocket 15 freewheeling on shaft 13. When the clutch faces are disengaged and power is provided to rotate shaft 13, the freewheel flywheels spin. When the clutch plates are engaged, sprocket 15 via transmission means 52 rotates sprocket 54, affixed on axle 80, thereby rotating shaft 80 and consequently tractive wheel 21. In the embodiment of FIG. 4, the power train is conveniently provided with disc brake 79 on tractive wheel 21, which may be hand-caliper operated.

Figure 5:
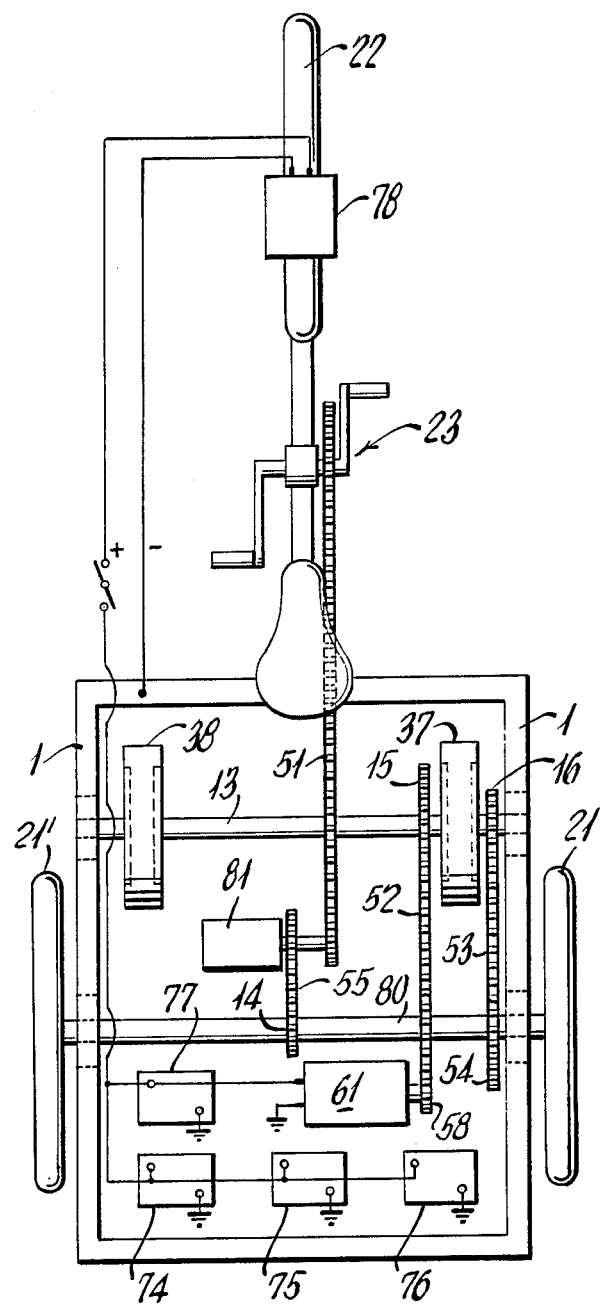
FIG. 5 is a top, fragmentary view of a wheeled vehicle including another embodiment of a power train according to this invention.

FIG. 5 illustrates a tricycle equipped with a power train including another embodiment of a freewheel flywheel transmission system according to this invention. In the embodiment of FIG. 5, electric motor 78 provides power to front wheel 22 to move the vehicle ahead, thus rotating tractive wheel 21. Additionally, the user by operating pedal assembly 23 also may provide power via transmission means 51 to rotate coaster brake 81. Coaster brake 81, via transmission means 55, in turn rotates sprocket 14, affixed to axle 80, thereby rotating tractive wheel 21 and sprocket 54 affixed to said axle. Axle 80 is rotatively supported on bearings (shown in phantom) by frame 1. Freewheeling shaft 13 is rotatively supported on bearings (shown in phantom) by frame 1. Flywheels 37 and 38 are rigidly affixed to shaft 13, and thus function as freewheel flywheels. When the vehicle is in motion, sprocket 54, affixed to axle 80, rotates, thereby providing power via transmission means 53 to rotate freewheel sprocket 16, affixed to shaft 13; sprocket 16 in turn rotates shaft 13, and flywheels 37 and 38 and sprocket 15 affixed to shaft 13. Sprocket 15, through transmission means 52, rotates sprocket 58 affixed to alternator 61, thereby operating said alternator to recharge batteries 74, 75, and 76 which provide power to electric motor 78. Voltage regulator 77 is used to complete the electrical circuit. Since sprocket 16 is a freewheel sprocket, when the vehicle is halted and axle 80 ceases to rotate, freewheeling shaft 13, and affixed flywheels 37 and 38 and sprocket 15 will continue to rotate, thereby operating alternator 61 and providing power to continue recharging batteries 74, 75, and 76 until the alternator resistance halts the rotation of sprocket 15 and flywheels 37 and 38.

It will be apparent to those skilled in the art that various changes and modifications may be made in the embodiments of this invention hereinabove described without departing from the scope or spirit of the invention. This invention therefore is not to be restricted to the precise details of the structure shown and described, but is defined by the claims which follow hereinafter.

I claim:

1. A freewheel flywheel transmission system for storing and later releasing kinetic rotational energy in a vehicle which comprises:

(a) a frame;
(b) a shaft rotatively supported by said frame;
(c) a plurality of flywheels comprising at least a first and a second flywheel, each flywheel being rigidly mounted on said shaft;
(d) means for rotating said shaft and thereby said plurality of flywheels in response to power transmitted from an external power source, said means including input sprocket means affixed to said shaft;
(e) sprocket means rotatively mounted on said shaft comprising at least a first and a second sprocket, wherein said second sprocket has a diameter greater than the diameter of said first sprocket;
(f) drive-wheel sprocket means;
(g) means connected to said first sprocket and said drive-wheel sprocket means for transmitting rotational movement from the first sprocket to the drive-wheel sprocket means;
(h) means connected to said second sprocket and said drive-wheel sprocket means for transmitting rotational movement from the second sprocket to the drive-wheel sprocket means;
(i) a first clutch means for engaging and disengaging the first sprocket and the first flywheel, the first clutch means comprising a clutch plate rigidly mounted to the first sprocket and a clutch plate rigidly mounted to the first flywheel;
(j) a second clutch means for engaging and disengaging the second sprocket and the second flywheel, the second clutch means comprising a clutch plate rigidly mounted to the second sprocket and a clutch plate rigidly mounted to the second flywheel; and
(k) control means for selectively engaging either the first clutch means or the second clutch means so as to selectively transmit the rotational movement of said plurality of flywheels to either the first sprocket or the second sprocket, and in turn to the drive-wheel sprocket means.

* * * * *